United States Patent [19]
Auer, Jr. et al.

[11] 3,772,640
[45] Nov. 13, 1973

[54] VEHICLE CONTROL SYSTEM WITH VEHICLE LOCATION ERROR CHECKING MEANS

[75] Inventors: John H. Auer, Jr., Fairport; Robert F. Anderson, Rochester; Vincent P. Kovalcik, Rochester; Donald B. Marsh, Rochester; Henry C. Sibley, Adams Basin; Willis R. Smith, Rochester, all of N.Y.

[73] Assignee: General Signal Corporation, Rochester, N.Y.

[22] Filed: Apr. 1, 1971

[21] Appl. No.: 130,127

[52] U.S. Cl.............. 340/23, 246/63 C, 340/31 R
[51] Int. Cl............................................. G08g 1/01
[58] Field of Search................ 340/31 R, 32, 38 R, 340/38 L, 22, 23; 235/150.24, 150.27, 151.32; 246/63 C, 187 R, 187 B

[56] References Cited
UNITED STATES PATENTS

| | | | |
|---|---|---|---|
| 3,588,494 | 6/1971 | Mertens | 246/63 C |
| 3,617,890 | 11/1971 | Kurauchi et al. | 340/32 |
| 3,609,676 | 9/1971 | Jauquet et al. | 340/23 |
| 3,440,600 | 4/1969 | Frech et al. | 340/31 R |
| 3,281,779 | 10/1966 | Yeiser | 340/23 |
| 3,029,893 | 4/1962 | Mountjoy | 340/38 L |
| 3,673,429 | 6/1972 | Perry et al. | 246/187 R |
| 3,268,727 | 8/1966 | Shepard | 246/187 R |

FOREIGN PATENTS OR APPLICATIONS

| | | | |
|---|---|---|---|
| 1,908,399 | 10/1969 | Germany | 246/187 B |
| 1,455,370 | 4/1969 | Germany | 246/187 B |

OTHER PUBLICATIONS

"Transit Vehicles Set for Automatic Running," Railway Signalling and Communications, August 1965, page 25.

"Control Techniques Revitalize Railroads," Control Engineering, March 1964, pages 86 & 87.

Primary Examiner—Kathleen H. Claffy
Assistant Examiner—Randall P. Myers
Attorney—Harold S. Wynn and Milton E. Kleinman

[57] ABSTRACT

A system for controlling the operation of a vehicle along the right of way from a remote wayside location has a first means including a ladder transmission line, or wiggle wire, along the wayside for determining the location of the vehicle by counting energy pulses generated by passage of the vehicle over transpositions, or steps, in the wiggle wire. A second means including spaced wayside markers delivers a signal intermittently determining location of the vehicle while a control means for generating a signal permitting the vehicle to proceed has been provided only if location of the vehicle as determined by the first and second means is substantially the same upon the passage of each of the markers.

There has also been provided a control system including a vehicle function control apparatus for governing the mode of vehicle tractive power in accordance with appropriate command signal profiles from the wayside. The improvement includes means for generating a braking signal profile included in the control apparatus operative for initiating a reversal of tractive power in accordance with the position relative to a selected stopping position. Means for decoupling tractive power upon the occurrence of a vehicle speed and deceleration of predetermined magnitude, according to the profile, has been provided whereby the vehicle is stopped at the desired position.

6 Claims, 4 Drawing Figures

VEHICLE CONTROL SYSTEM WITH VEHICLE LOCATION ERROR CHECKING MEANS

BACKGROUND OF INVENTION

This invention relates to automatic remote control of vehicles and in particular to control of air supported vehicle utilizing a linear induction motors as the tractive means. A system of this general nature is disclosed in the Mertens U.S. Pat. No. 3,588,494 for air supported vehicles, and a similar system for rail vehicles is disclosed in the Shepard U.S. Pat. No. 3,268,727.

An air supported vehicle travelling in a guideway as proposed by the present disclosure does not permit the use of conventional rapid transit techniques for insuring safety. While required functions for various aspects of vehicle safety are the same as with rail type rapid transit vehicles, the means for implementation of such safety systems are quite different in view of the novel problems associated with air supported vehicles.

An essential element of a vital safety system is the determination of each vehicle position, from which a separation between vehicles may be deduced. From the separation and the effective emergency braking rate, the maximum speed from which the vehicle can stop short of the preceding train may be determined. The safety function operates to compare the actual speed with the speed limit and apply the brakes if actual speed exceeds the limit. If because of curvature in the guideway, a civil speed limit is imposed in addition to the safe separation limit then the lesser of the two is chosen.

Analysis of vehicle movement shows that in order to obtain the short headways required for peak system capacity, a position determining means must have high resolution, very much higher than is required for conventional rapid transit operation. Even by using moving block techniques for determination of the position of a vehicle and associated shortening of headways, the conventional track circuits utilized in railroad operation are not adequate to satisfy the requirements of the present system.

In addition to the requirement for accurate vehicle position information, there are also requirements for improved communication systems between vehicle and the wayside in order to control a number of vehicles automatically along the same right of way and a system of stopping the vehicle accurately at selected positions without the use of conventional braking apparatus.

It is therefore an object of the present invention to provide a system which obviates one or more of the limitations of the described prior arrangements.

It is another object of the present invention to provide a novel apparatus for controlling automatically a vehicle control system.

SUMMARY OF INVENTION

There has been provided a system for controlling the operation of a vehicle along a right of way from a remote wayside location. First apparatus having a ladder transmission line or wiggle wire along the wayside substantially continuously determines the location of the vehicle by counting energy pulses generated by passage of the vehicle over transpositions in the wiggle wire, while a second apparatus including spaced wayside markers delivers a signal intermittently determining the location of the vehicle. A control apparatus generates a signal permitting the vehicle to proceed only provided that the location of the vehicle, as determined by the first and second apparatus is substantially the same upon passage of each of the markers.

There has also been provided in the control system a vehicle function control apparatus for governing the mode of vehicle tractive power in accordance with appropriate command profiles. The improvement therein comprises a system for generating a braking signal profile included in the control apparatus operative for initiating a reversal of tractive power in accordance with vehicle position relative to a selected stopping position. In addition, a system is provided for decoupling tractive power upon the occurrence of vehicle speed and acceleration of predetermined magnitude according to the profile whereby the vehicle stops at the desired position.

For a better understanding of the present invention together with other and further objects thereof, reference is had to the following description taken in connection with the accompanying drawings, while its scope will be pointed out in the appended claims.

DESCRIPTION OF PREFERRED EMBODIMENT

In the present invention a wayside located computer is used to generate a function for controlling the operation of a remotely located vehicle along a right of way. The computer is coupled to the vehicle over a suitable communications channel while position checking apparatus and the like is located both on the vehicle and at the wayside for providing information relative to the safety of the system between the control computer and the vehicle.

The type of vehicle contemplated for use with the present apparatus is an air supported vehicle travelling in a guideway driven by a linear induction motor. While other types of vehicles may utilize the principles described by the present disclosure, the system was designed around a particular vehicle and modifications of certain details of the system might be necessary when utilizing another vehicle.

Figure 1A:
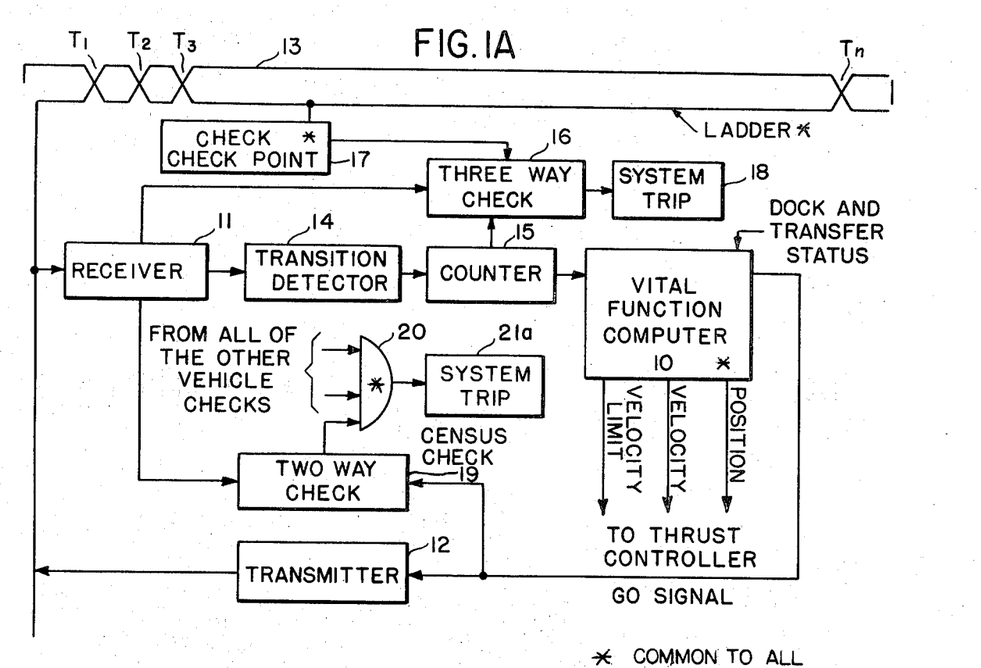
FIG. 1A is a block diagram of a safety system according to a preferred embodiment of the present invention.

An essential element in the control of a vehicle transportation system is safety. Commands for starting, stopping and governing the speed of the vehicle may be generated only after safety considerations of the system as a whole are determined. FIG. 1 generally shows the safety system utilized in the present invention. A vital function computer 10 generates, in accordance with a system program and variable input signals, controls for operation of each of the vehicles in the system. A receiver 11 and transmitter 12 are located at the wayside for each vehicle. Similar transmitting and receiving devices are included on the vehicle and communications is established over a wiggle wire 13 located adjacent to the vehicle right of way.

The receiver 11 is responsive to an FM carrier frequency associated with the vehicle carried transmitter. Likewise the transmitter 12 generates an FM carrier which is received by an associated receiver on the vehicle. The receiver 11 and transmitter 12 are arranged with apparatus for detecting a number of sub-carriers for carrying various bits of information to and from the vehicle. Each vehicle has associated therewith a receiver and transmitter tuned to different frequencies from all the other vehicles and likewise the receiver 11 and transmitter 12 have frequencies associated with only one vehicle in the system. A plurality of simultaneous messages may be transmitted over the wiggle wire 13 by the associated sending and receiving apparatus on the wayside and on each of the vehicles.

An essential element in the safety system described herein is the determination of the position of each of the vehicles so that separation btween the vehicles may be computed. To accomplish this result, the transmission line ladder, or wiggle wire, 13 is placed along the right of way and consists of a pair of communcations wires twisted in such a way as to have transitions $T_1$, $T_2$, $T_3$ ... $T_N$ every two inches. The length of the transitions and their number is a consideration which may be variable in accordance with the resolution requirements of the system. However, the two inch transitions are convenient for the present system and function quite accurately. A signal imposed on the wiggle wire 13, by a vehice carried antenna radiating a signal to the wiggle wire changes phase each time the antenna passes a transition. The manner in which this is accomplished is explained further in the discussion. However, it is sufficient to note that as the vehicle moves along the right of way each time a transition is crossed, the input signal to the wiggle wire from the vehicle is switched in phase and such is detected at the receiver 11 as a phase shift in the carrier frequency $F_C$. A transition detector 14 is responsive to the signal received and produces an output for each transition. A counter 15 produces an output for each count generated by the transition detector 14 and another output for a preselected total number of transitions. The running count for each transition is periodically fed to the computer 10 in order to determine position, velocity, and other functions to be used by the apparatus and the count or signal for a particular number of transitions is also fed to three-way check 16. Along the wayside are located check points at uniform distances. The check point 17 shown is responsive to the passage of a vehicle and produces a signal for communication to three-way check 16 each time a vehicle passes the particular check point. The check point marker apparatus responsive to passage of vehicles can be as is disclosed, for example, in FIG. 1A of Wilcox U.S. Pat. No. 3,284,627. Apparatus on the vehicle in addition is responsive to the check point and produces a signal which is transmitted to the receiver 11 indicating the vehicle's passage by a check point 17. This signal is fed from the receiver 11 to the three-way check 16. A system trip 18 for producing an alarm is held in an OFF condition by the three-way check only if a signal from the counter 15, receiver 11 and the wayside check point 17 are received within a preselected interval of time. The computer 10 having been fed information relative to the total number of counts detected or produced at the output of the counter 15 is aware of the position of the vehicle. However, the wayside check point 17 re-enforces this information with periodic checks at perhaps every 300 feet. One way in which the computer 10 can be programmed to provide this information is known in the art as disclosed in the above-mentioned Shepard U.S. Pat. No. 3,268,727 and thus detail description of the programming herein is unnecessary.

The transmission of a signal from the vehicle to the receiver 11 over the wiggle wire 13 indicating that a wayside point has been crossed provides additional information that the vehicle is aware of its position relative to the check points. Thus, not only is the position of the vehicle checked relative to the transpositions of the wiggle wire and the wayside check point, but also the communications between the vehicle and the wayside is re-enforced or checked. If the system trip 18 is released by the three-way check 16, then an alarm signal is produced which may be used to shut down a portion of the system or the whole system as the case warrants.

As previously mentioned, there is one counter for each vehicle and each one stores the current position of the associated vehicle. This information is transferred periodically into the vital function computer 10 for processing. During the processing cycle, the computer performs calculations relative to distance of the vehicle in front and determines the safe speed based upon this information. The computer also compares the safe separation speed with the civil speed limit for the position of the vehicle and selects the lesser of the two as the speed limit and calculates the vehicle speed by taking the difference between its position for the current cycle and that for the preceding cycle. If the actual speed is less than the speed limit, it generates an output signal and permits the vehicle to continue. The whole cycle is repeated using a fresh program to check and generates a GO signal when both computations agree. If it is safe for the vehicle to continue, the GO signal is sent through the transmitter 12 to the vehicle over the wiggle wire 13 and reception of this signal holds off applications of the emergency brakes on the vehicle. The GO signal when transmitted to the vehicle is repeated and sent back over the wiggle wire 13 for reception by the receiver 11. Receiver 11 generates a signal in response to the repeated GO signal and is coupled to two-way check 19, which is likewise responsive to the GO signal generated by the computer 10. If the GO signal generated by the computer is not repeated by the vehicle, then a signal to AND gate 20 is held off and the system trip 21a is activated for providing an alarm signal. Each vehicle has a provision for this two-way check 19 and inputs from all the other vehicle checks are transmitted to the AND gate 20 for processing. The AND gate 20 may include a memory for holding all the vehicle check outputs from the two-way checks 19 until a scan cycle is complete. The AND gate 20 is shown merely to show an example of how a census may be taken of the vehicles present in the system. Actually, many of the functions illustrated as separate blocks outside the central processing unit in FIG. 1A may be implemented by software within the central processing unit.

Figure 1B:
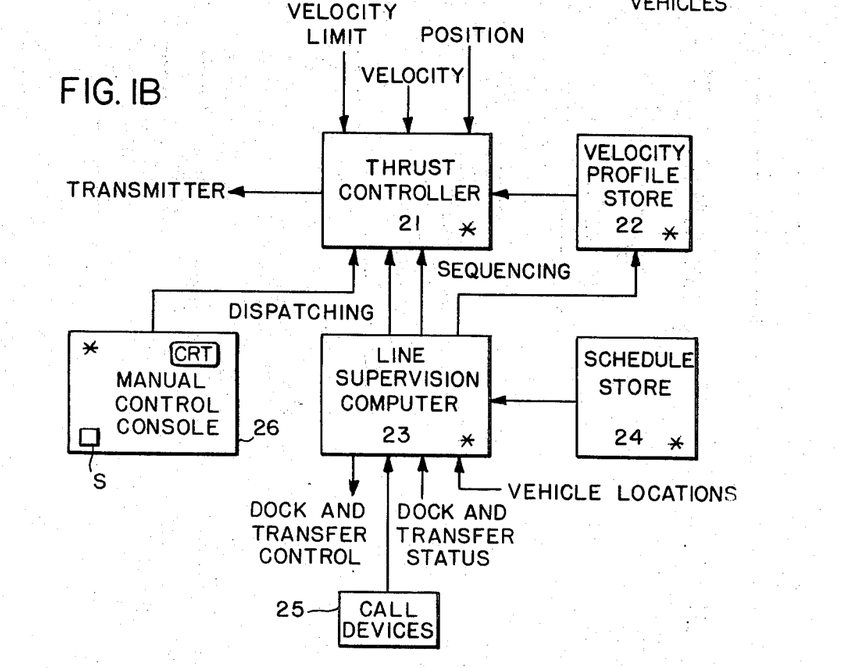
FIG. 1B shows control equipment used in connection with the apparatus of FIG. 1.

FIG. 1B shows another portion of the control system for govering the operation of the vehicle. Outputs from the vital function computer 10 are transmitted to the thrust controller 21, the position, velocity and velocity limit are analyzed by the controller and an output signal is produced which is coupled to the transmitter 12. A velocity profile storage means 22 is a memory specifying the desired velocity as a function of vehicle position and signals are coupled to the thrust controller for governing the velocity of the vehicle in accordance with this profile as well as signals from the vital function computer 10. Programming to accomplish this mode of operation will be obvious from the more detail disclosure in the abovementioned Shepard U.S. Pat. No. 3,268,727.

As the vehicle approaches a stopping area, a specific stopping position assignment is made by the line supervision computer 23. This assignment selects a stopping segment for the velocity profile which causes the vehicle to stop opposite the proper position or dock. Apparatus for determining a stopping pattern can be provided at the central station comparable to apparatus carried by a vehicle in the Kovalcik et al. U.S. Pat. No. 3,639,754, filed Dec. 24, 1969. When the time comes to move the vehicle from a dock position to a transfer position, the program appropriate for this segment is called out of storage and transmitted over a dispatching channel to the thrust controller 21.

Supervision over the entire line is a non-vital function whose purpose is to maintain smooth traffic flow and to match system capacity to passenger demand. It is implemented as part of the control center computer system shown in FIG. 1B in relation to the overall system. The line supervision computer 23 has access to a stored time table schedule 24 which embodies the complete system operating plan. It is also supplied with an up-to-date status report concerning the vehicle locations and the positions of the docking and transfer mechanisms as shown by the appropriate legends on the drawing. Based on this information, it issues instructions to the thrust controller 21 to dispatch trains at scheduled times. In case of schedule disruption, it dispatches vehicles as required to maintain service. By monitoring and planning an operation, line supervision anticipates conflicts and causes a thrust controller to operate the vehicles so as to avoid emergency braking. Subject to interlocking constraints imposed by the independent safety system of FIG. 1B, it assigns docking locations and generally sequences operation in the station and transfer areas. It is programmed to fill service gaps when conditions demand and to recycle vehicles to correct passenger induced disruptions. One of the major functions of line supervision is to stabilize the system and to promote rapid recovery from the effects of outside disturbances. Line supervision computer 23 maintains an inventory of cars and their locations and can remove cars from service or recall them from the storage area. During off hour operation, it serves requests coming from the call buttons 25 on station platforms and circulates cars to assure that vehicles in empty docks are properly distributed.

At the control center, a manual control console 26 is provided to permit manual operation of all facilities. In case of an emergency, the whole system may be shut down at once by pushing an emergency stop button S. The manual control console 26 includes a cathode ray tube CRT for visual display of vehicle positions.

Figure 2:
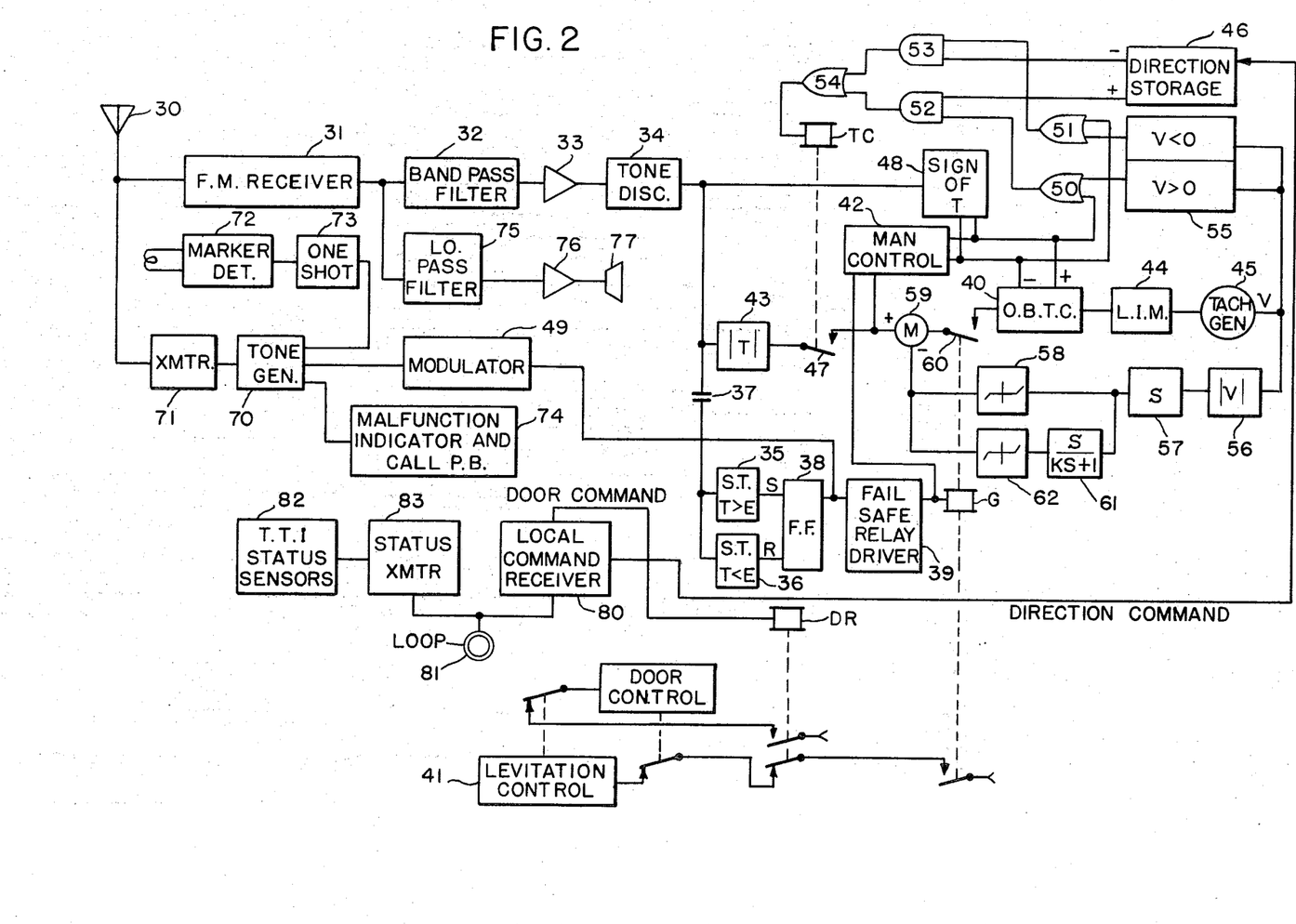
FIG. 2 shows on-board vehicle control equipment.

FIG. 2 is used to detail the vehicle carried equipment. Command signals and the like transmitted over the wiggle wire 13 are received by antenna 30. This same antenna is that which provides the signal which is detected by the receiver for each transposition of the wiggle wire 13. In accordance with the general system concept. each vehicle is assigned to a private communication channel with which is maintains a full duplex connection with the central office. Channel assignments are usually implemented with frequency selectors giving each vehicle an independent communication with its associated safety apparatus and the vital function computer 10.

Longitudinal movement of each vehicle may be controlled in any of four modes: automatic, emergency stop, manual on-board and manual remote. During automatic control, longitudinal movement of the vehicle is controlled by the wayside computer 23 over the wiggle wire 13. Minor controls are provided on the vehicle to limit acceleration and jerk to values considered satisfactory for passenger comfort. These limits are not effective in the emergency stop mode. Finally, a constraint on the direction of the motion is enforced on the vehicle in all modes except the manual on-board mode.

The automatic control mode is in effect whenever a valid directional command is established on the vehicle and neither the on-board manual nor emergency stop modes are in effect. During automatic control, the thrust direction and command voltage level are determined by the wayside and transmitted to the on-board train control. Thrust command information is transmitted to the car or vehicle in the form of a frequency modulated audio sub-carrier of the carrier frequency $F_C$. The band of frequencies is selected from the carrier $F_C$ by the band-pass filter 32 and presented to the tone discriminator 34 after amplification at 33. The output of tone discriminator 34 is a voltage proportional to the tone frequency and in turn to thrust. The discriminator output 34 is positive for a command thrust in one direction and negative for a thrust command in the other direction. The magnitude of the voltage is proportional to the thrust command.

In addition to the thrust information, a check message is processed by the vehicle communication system. Periodically each car receives a positive shift of the thrust carrier alternately with a negative shift. This check cycle has an average value of zero and a deviation from the normal thrust command of short duration so that it can easily be filtered from the thrust signal that is sent to the on-board thrust controller 40. These short shifts in the thrust command are detected by two Schmitt triggers 35 and 36. The D.C. component of the tone discriminator output 34 is filtered by the capacitor 37. The Schmitt triggers 35 and 36 are each responsive respectively to positive and negative shifts in the thrust command signal. The alternate outputs of the Schmitt triggers operate a flip-flop 38, which pulses ON and OFF as long as the car receives both positive and negative check shifts. This signal is used to energize a vital GO relay G through fail-safe relay driver 39. If a breakdown in communications takes place, the GO relay G is deenergized and a front contact of the GO relay is opened cutting off energy from the levitation control 41 which immediately drops the vehicle onto its skids. In addition another contact on the GO relay controls the energy coupled to the on-board thrust controller 40.

Manual control may be imposed on the vehicle by the controller 42. The manual control 42 is provided on each vehicle for use in the event of loss of the ability to move the vehicle remotely. The manual on-board control 42 supersedes all other modes of control and a direction assignment is not required for this mode. However, the limits on acceleration and jerk remain in effect as will be explained further in the discussion.

Signals from the tone discriminator 34 are normalized to absolute values by the apparatus shown at 43 and the signals are transmitted to the on-board thrust controller 40 which governs the operation of the linear induction motor 44. Signals indicative of the speed are generated by a tachometer 45.

In order to stop the vehicle in other than an emergency stop mode, wherein the levitation of the vehicle is removed and the vehicle stops by skidding in the guideway, the thrust of the linear induction motor is reversed. A friction brake, if available, could have been depended upon to orient its force against the direction of motion to bring the vehicle to rest. However, reverse thrust braking can actually accelerate the vehicles in reverse direction is misapplied. The reversal of linear induction motor 44 thrust for braking purposes must therefore be undertaken with full knowledge of the direction of motion of the vehicle. It is absolutely imparitive that the system be so organized that an acceleating force can never be confused with braking force. To satisfy this requirement, a direction control sub-system is provided on the vehicle. This sub-system uses vital components which can be depended upon to fail in a safe manner. Two bits of memory are provided on each vehicle; one for authorizing movement in one direction and the other for authorizing movement in the opposite direction. They are arranged so as to prevent thrust demand signal from the communication sub-system from being applied to the on-board thrust controller 40 if both are in the same state, either set or reset. This directional storage 46 must have one output set and the other reset before the vehicle has authorized to move in the associated direction. Thrust demand signals from the communcation sub-system which tend to move the vehicle in the other direction are rejected. A vital thrust control relay TC is enabled by the directional storage 46 to respond to the thrust direction signal feeding the on-board thrust controller 40 if it calls for a thrust in the assigned direction of motion. The thrust control relay TC is also allowed to respond to the signal generated by the tachometer 45 but only if the vehicle is moving in the assigned direction.

Thrust commands from the communication sub-system must pass through a normally open contact 47 of the TC relay before they can reach the on-board thrust controller 40. It is not possible, therefore, to apply thrust commands which tend to move the vehicle in the unassigned direction since the thrust control relay is not energized under this condition.

The signal delivered at the output of tone discriminator 34 is received by the polarity responsive apparatus at 48 to determine the sign of the thrust control signal. The sign of 48 produces a signal which may be used to operate the TC relay contact 47 when the vehicle is at rest. The sign of the signal produced at the output of the discriminator 34 is important for the safety of the system as previously described because the vehicle is not to move in a direction unassigned by the storage 46. OR gates 50 and 51 conduct the output of apparatus 48 to AND gates 52 and 53 respectively and the outputs of the AND gates are coupled to OR gate 54 and the relay TC. Information from the direction storage 46 also applied to the inputs of the AND gates 52 and 53 and if the sign of output 48 matches the direction storage 46, then an output from either of the gates 52 or 53 will activate OR gate 54 for picking the relay TC. The thrust control signal is then communication over the closed contact 47 to the on-board thrust controller 40 activating a linear induction motor 44.

Once the vehicle has obtained a certain speed in the assigned direction, the tachometer 45 provides an alternate signal which by itself holds the thrust control relay TC energized, through the directionally sensitive velocity detector 55, having appropriate inputs responsive to the tachometer 45 signal, of one polarity or another, indicative of the vehicle direction. It can be seen from this that it is possible to apply reverse thrust for braking until the vehicle speed falls below the threshold level provided by the detector 55 at which time the thrust control relay TC loses its energizing signal because the output of the polarity sensitive apparatus 48 and that of the directionally sensitive velocity detector 55 are not compatible with the direction storage output 46.

In this embodiment there is no braking available below speeds of the threshold level so it is therefore desirable to keep the threshold as low as possible. This requirements, however, conflicts with the requirement for making a precision jerk limited stop. When the thrust command is cut off by the falling out of the TC relay, the jerk limiting loop will act to taper the acceleration from the value at cut off to zero. The velocity, however, does not automatically go to zero when the acceleration does. In fact, if the cut off velocity is too low, the terminal velocity may actually be reversed and the vehicle will drift backwards. To avoid this difficulty by means short of introducing a friction holding brake, it is necessary to make the threshold dependent upon the level of the acceleration. Thus, as the vehicle is approaching a dock for a precision stop, the TC relay will be deenergized at a speed selected so that acceleration and velocity will tend to decrease smoothly and reach zero simultaneously under the control of the local jerk limitation feedback loop shown in the drawing.

The output of the tachometer 45 is fed to a velocity sensitive device 56 which is responsive to the absolute value of the velocity regardless of sign. The velocity is in the proper direction insured by the other checks in the system and the velocity sensitive device 56 merely produces a signal proportional to the velocity. An acceleration signal introduced by the differentiator 57 and a limiting means 58 produces an output whenever the acceleration exceeds the limit programmed therein. Output signals from the acceleration limiting means 58 are coupled to the summation junction 59 through the front contact 60 of the GO relay G to the on-board thrust controller 40 for modifying the controller in accordance with the acceleration limit set by the limiting means 58. The output of the differentiator 57 is also coupled to the input of a function generator 61 which is governed by the function shown therein which is a jerk limiting control. The acceleration signal from the differentiator 57 is modified by the function generator 61 which produces a signal indicative of the jerk or rate of change of acceleration. Another limiting means 62 imposes limits on the jerk signal which produces a signal for transmission to the on-board train controller through the summation device 59. It can be seen by this feedback loop, including both acceleration and jerk limitation, that the vehicle may be stopped at a precision location without the use of friction braking apparatus. It is to be understood that the limits set in the limiting means 58 and 62 respectively are maximum limits compatible with the stopping profile as determined by the apparatus shown in FIG. 1A, i.e., velocity profile storage 22, which governs the thrust control'er 21 for providing a comfortable velocity profile for the vehicle. It is also to be understood that the position of the vehicle is monitored all through the system and that the precision stop is in accordance with the position of the vehicle relative to the wiggle wire responsive to the signal transmitted by the antenna 30. A tone generator 70 is provided which is the dual of the communications channel between the wayside and the vehicle. The tone generator 70 produces a carrier frequency $F_{c1}$ and a combination of sub-carriers within the reception range of receiver 11. The transmitter 71 produces output signals for conduction through the antenna 30 and over the wiggle wire to the receiver 11. A constant tone is generated by the generator 70 and coupled to the transmitter 71 which tone is used to detect the position of the vehicle. As previously mentioned, a constant tone is sent over the wiggle wire, the phase of which is changed as the vehicle traverses each transposition of the wiggle wire, and detected by the receiver 11 in combination with the transition detector 14. A marker detector 72 located on the vehicle is used to repeat the marker location signal from the wayside check point 17. The marker detector 72 is responsive to the check point 17 and produces an output to the one-shot multivibrator 73. A tone is produced by the generator 70 indicative of the ON time of the one-shot 73 and is coupled to the transmitter for reception at the wayside by the receiver 11 over a different sub-carrier. By this means, the three-way check signal is satisfied as described earlier in the disclosure.

A malfunction indicator and call apparatus 72 is provided which can be used to transmit a malfunction signal or a voice indication over still another sub-carrier of the tone generator.

The signals received by the FM receiver 31 include a number of sub-carriers; one of which is for carrying audio communications to the vehicle or to operating personnel thereon. A low pass filter 75 filters out the sub-carrier and the signal is amplified in the amplifier 76 and produced at the output of the speaker 77.

A return loop from the flip-flop 38 is coupled to modulator 49 and coupled to the tone generator which initiates another sub-carrier frequency for transmission to the central computer for checking that the tone discriminator signal includes the alternate positive and negative pulses of the GO signal used to check the validity of the thrust command signal.

A local command receiver 80 is disposed on the vehicle to receive signals from a minor receiver loop 81. Information transmitted to the loop 81 is accomplished over auxiliary loops mainly located at docking and stopping areas. The local command receiver 81 is capable of processing generally two signals; that of door command and direction command for respectively controlling contacts on the DR relay and direction storage means 46. In this connection, it is well to note that rigid limits are imposed on the control of the directional memory 46 bits. The vehicle receiver 80 which processed the directional signals that set the directional memory bits are very insensitive and do not respond to spurious signals. The directional signals are transmitted to the vehicles through coupling coils 81 which are located only at the dock areas and the lane transfer areas. Indication signals are transmitted from the vehicle to the wayside by the same coupling coils from signals generated by the status sensor 82 and status transmitter 83 to verify acceptance and correct implementation of commands to change the directional memory. There is therefore satisfactory assurance that the directional memory on the vehicle has been set in accordance with the commands of the advisory computer 23 and will remain in that same state until the vehicle reaches the other end of the system.

Figure 3:
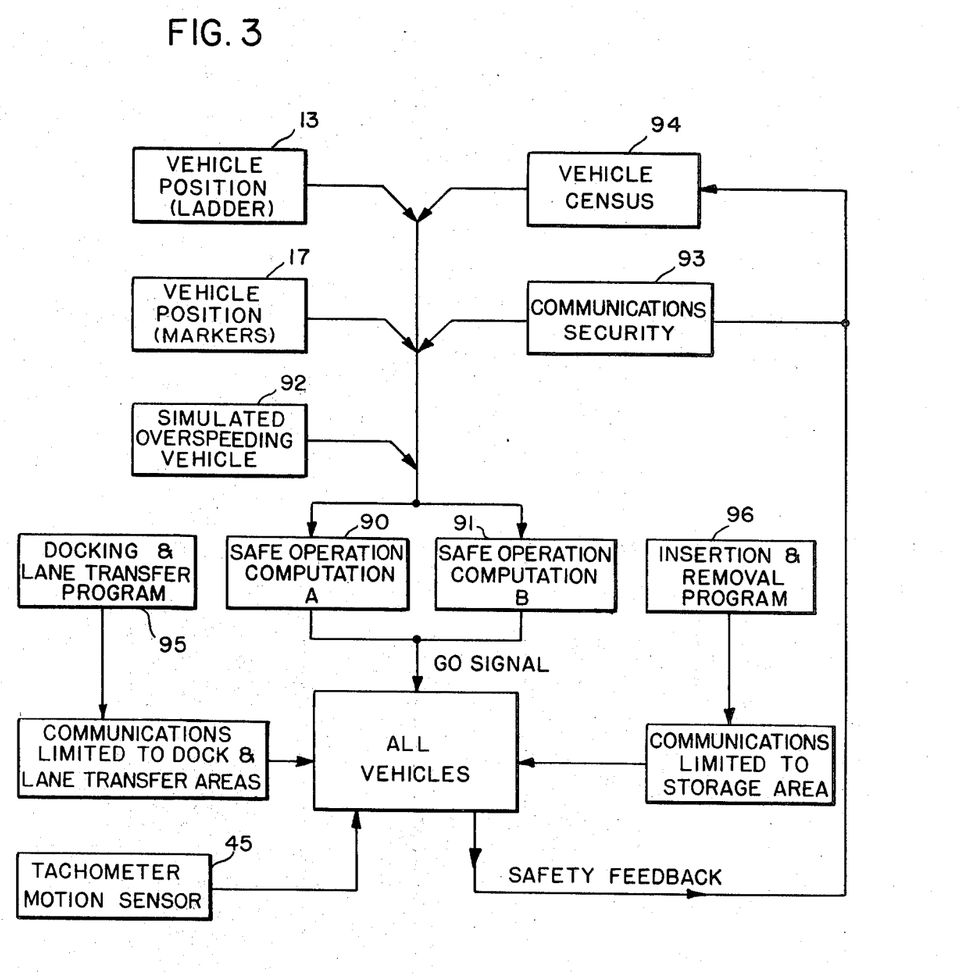
FIG. 3 shows a block diagram of cooperating apparatus relative to the safety sub-systems.

A summary of safety sub-systems is described as follows with reference to FIG. 3. The safe operation of an automated transportation system requires correct inputs to the control system and error free commands from the control systems. The purpose of the safety sub-system is therefore to insure that the system will operate if only these conditions are met. Two major areas of concern to the safety sub-system are integrity of communications between the control system and each vehicle and the correctness of the action taken by the central control center. The vital function computes and continuously monitors the performance of all vehicles and imposes a safety speed limit on each vehicle based on its speed and position relative to the vehicle ahead of it and other considerations, such as curves and local area speed restrictions. A computation of the safe speed limit depends on reliable vehicle position information and correct calculation. The calculations are safe-guarded by requiring complete agreement between alternate calculations made by two independent computer programs indicated by safe operation computations A and B, 90 and 91 respectively. These calculations are made on a time cycle extremely short compared to vehicle reaction time, typically 50 milliseconds. The calculations themselves are further verified by inserting performance of a simultated over-speeding vehicle 92 and the checking that both calculations A and B will shut the system down if this over-speeding should continue.

As each vehicle moves along, it generates a pulse each time it crosses a transposition in the ladder or wiggle wire 13. The position is determined accurately by counting these pulses and, of course, the different in position between successive calculations gives vehicle velocity. Since this position information is basic to the entire operation, an independent assessment of position is made by noting the passage of each vehicle by the wayside marker 17. These two independent position measurements are cross-checked: marker 17 must be passed at the moment that a wiggle wire 13 transposition count is sensed; the wiggle wire count must occur each time a marker 17 is passed. Furthermore, each time a marker 17 is passed, both the marker and the vehicle must report it. Any failure to obtain the three-way agreement when the vehicle passes a marker is grounds for system shutdown.

System shutdown is held off by the GO signal. As long as the signal is generated in the control center and is received on each vehicle, the system operates under the direction of the supervisory program. The GO signal is generated only if the position inputs and computations agree and if all vehicles are accounted for and communication with these vehicles is verified. Loss of the GO signal results in simultaneous emergency stopping of all vehicles by an on-board fail-saft system.

Every vehicle must be accounted for at all times except when it is in the garage with power off. The communication between each vehicle and the control center must be absolute. It must be impossible for a vehicle to operate under another vehicle's command without causing immediate shutdown. Reliable communication of all vehicles is provided by a private line system 93 using a different pair of frequencies for each vehicle. The signals are carried by the wiggle wire 13 and are inductively coupled to the vehicles. The GO signal is used as a channel security and vehicle census check. Each safety calculation is followed by the transmission of a GO pulse to the vehicles. The vehicles then repeat this pulse back to the control center. The next calculation will not transmit a GO signal unless the vehicles have response to the first GO pulse in the manner demanded by the program. Response to this GO pulse allows the cycle to continue. Satisfactory results from communication calculation A, 90 produce a GO pulse of one type, for example (+), and satisfactory results from computation B, 91 produce a GO pulse of another type, namely (−). Continued operation requires alternate reception of these two (+) and (−) pulses. To insure that a vehicle is not responding to a GO pulse for a different vehicle, the simulated over-speeding vehicle 92 is substituted for the position data for each car once every N seconds, where N is a total number of vehicles. This substitution results in withholding of the GO signal to that vehicle on that scan. The reply from that vehicle at that time must also omit the GO signal providing that the vehicle is not responding to any of the signals intended for the other vehicles. After N scans, central control must generate a GO check signal which provides that the communication signal security check has been made on all cars. This amounts to a census check, as shown by the feedback loop to vehicle census 94.

The functions associated with the docking and lane transfer program 95, such as door commands and direction assignments must not be controlled accidentally on the main line. These frunctions are handled by a separate inductively coupled system 95 which can be reached only when a vehicle is in a correct position in the docking or lane transfer area. The control signals for these functions are entirely different from those signals transmitted throughout the system on the wiggle wire.

Since safety depends on strict accounting of all vehicles, insertion of a vehicle into the system or removal from one of one from the system must satisfy the census requirements. The vehicle must receive a continuous GO signal or it cannot move. When a vehicle is added to the system, its communication equipment can provide a GO signal only when it satisfies the census and security checks. Since the vehicle is added to this system from the storage area, these checks are satisfied or it cannot move out of the storage area.

When a vehicle is removed from the system, it must be driven into the storage area under the supervision of the vital function computer 10. After the vehicle is moved off the main line, its central control channel equipment is switched into a section of the wiggle wire 13 in the storage area which is isolated from the main line. After vertification that the vehicle is properly identified, removal can be completed by disconnecting that vehicle's channel equipment and registering its removal in the census check logic 94. Information relative to the insertion and removal of vehicles is accomplished by program apparatus 96.

Since thrust must be reversed in order to stop, the vehicle safety system is required to insure that prolonged thrust reversal does not result in running the vehicle backwards against traffic. The tachometer 45 is driven by a guide roller which senses vehicle motion and direction. The fail-safe thrust control relay is held energized only when the vehicle motion agrees with the direction selected at authorized geographical locations by the vital function computer 10. When reverse thrust has brought the vehicle velocity to zero, this relay TC opens its front contact and prevents further application of thrust until the thrust command is brought into agreement with the operating direction stored in the vehicle.

While there has been described what is at present considered to be the preferred embodiment of the invention, it will be obvious to those skilled in the art that various changes and modifications may be made therein without departing from the invention.

What is claimed is:

1. A vehicle control system for governing operation of a plurality of power driven vehicles along a right of way from a control station including first means generating pulses responsive to the passage of vehicles for sensing location of the vehicles including apparatus at the control station for counting the generated pulses which correspond to incremental distances of vehicle progress, second means for sensing location of the vehicles including location calibrating communication apparatus having wayside markers at spaced points along the right of way and control means including a computer at the control station for selectively governing power operation of each of the vehicles in accordance with the condition of the first and second sensing means wherein the improvement comprises:

a. means rendered effective each time a vehicle passes one of the markers for communicating a first signal indicative of the location of the marker that has been passed from the marker to the control station and for communicating a second signal indicative of passage of each marker from the vehicle passing the marker to the control station, and b. three-way checking means permitting communication of a GO signal from the control station to a vehicle by the communicating means upon passage of each marker only provided that the first and second signals are received at the control station and only provided that the marker thus identified is for a wayside location substantially the same as a location sensed by the first sensing means.

2. A vehicle control system according to claim 1 wherein two-way checking means is provided for permitting transmission of the GO signal by the control means only so long as the control station is periodically receiving signals communicated from all vehicles in the vehicle control system.

3. A vehicle control system according to claim 2 wherein the control means includes communication of GO control signals from the control station to the vehicles comprising selectively a first distinctive signal for designating driving thrust in one direction and a second distinctive signal for designating driving thrust in the opposite direction.

4. A vehicle control system according to claim 3 wherein checking means is provided including periodically communicating by the control means of the first and second distinctive signals alternately and wherein means is provided for validating reception of a GO signal on a vehicle dependent upon the periodic reception of the first and second distinctive signals alternately.

5. A vehicle control system according to claim 3 wherein traffic direction storage means is provided on a vehicle and the control means includes apparatus including the storage means for permitting reverse thrust to be generated for braking of the vehicles only to an extent for maintaining vehicle operation in a direction as registered in the storage means.

6. A vehicle control system according to claim 1 wherein the first means for sensing location of the vehicles comprising a two conductor transmission line of the ladder type having frequent transpositions and wherein apparatus is provided for sensing the passage of each vehicle past the transpositions for counting each transposition as an incremental distance of travel for the vehicle.

* * * * *